US012546138B2

(12) United States Patent
Smart

(10) Patent No.: US 12,546,138 B2
(45) Date of Patent: Feb. 10, 2026

(54) RETRACTABLE HANDLE ARRANGEMENT FOR A DOOR OR THE LIKE

(71) Applicant: JAGUAR LAND ROVER LIMITED, Coventry (GB)

(72) Inventor: Sean Smart, Rugby (GB)

(73) Assignee: Jaguar Land Rover Limited, Coventry (GB)

( * ) Notice: Subject to any disclaimer, the term of this patent is extended or adjusted under 35 U.S.C. 154(b) by 99 days.

(21) Appl. No.: 18/138,521

(22) Filed: Apr. 24, 2023

(65) Prior Publication Data

US 2023/0258019 A1 Aug. 17, 2023

Related U.S. Application Data

(63) Continuation of application No. 16/383,123, filed on Apr. 12, 2019, now Pat. No. 11,661,762, which is a (Continued)

(30) Foreign Application Priority Data

Jun. 21, 2011 (GB) ..................................... 1110487

(51) Int. Cl.

*E05B 5/02* (2006.01)
*E05B 85/10* (2014.01)

(Continued)

(52) U.S. Cl.

CPC ............ *E05B 5/003* (2013.01); *E05B 85/103* (2013.01); *E05B 85/107* (2013.01); *E05B 5/006* (2013.01);

(Continued)

(58) Field of Classification Search

CPC ...... E05B 85/107; E05B 85/103; E05B 81/06; E05B 5/006; E05B 5/003; E05B 85/10;

(Continued)

(56) References Cited

U.S. PATENT DOCUMENTS 2,164,150 A 6/1939 Brewster
2,201,963 A 5/1940 Wartian (Continued)

FOREIGN PATENT DOCUMENTS

DE 729425 C 12/1942
DE 3403003 A1 8/1985

(Continued)

OTHER PUBLICATIONS

Combined Search and Examination Report corresponding to GB application No. 1211026.8, dated Oct. 22, 2012, 6 pages.

(Continued)

*Primary Examiner* — Mark A Williams

(74) *Attorney, Agent, or Firm* — TROUTMAN PEPPER LOCKE LLP; Dustin B. Weeks; Nicholas H. Doss

(57) ABSTRACT

A retractable handle arrangement includes a handle movable between stowed and deployed states, a motor and transmission mechanism arranged to couple the motor to the handle for moving the handle from the stowed state to the deployed state when the motor is driven in a first direction, and to modulate the force exerted on the handle and the speed at which the handle is deployed as the handle travels from the stowed state to the deployed state.

18 Claims, 10 Drawing Sheets

Related U.S. Application Data continuation of application No. 14/127,943, filed as application No. PCT/EP2012/062040 on Jun. 21, 2012, now Pat. No. 10,294,692.

(51) Int. Cl.

| | |
|---|---|
| *E05B 5/00* | (2006.01) |
| *E05B 17/10* | (2006.01) |
| *E05B 81/76* | (2014.01) |
| *E05B 85/14* | (2014.01) |
| *E05B 85/16* | (2014.01) |

(52) U.S. Cl.

CPC ............... *E05B 17/10* (2013.01); *E05B 81/76* (2013.01); *E05B 85/14* (2013.01); *E05B 85/16* (2013.01); *Y10T 292/57* (2015.04)

(58) Field of Classification Search

CPC . E05B 79/06; E05B 81/34; E05B 1/00; E05B 1/0053; E05B 2001/0076; E05B 5/00; Y10T 292/57; Y10T 70/5889; Y10T 292/1082; Y10T 70/5761; Y10T 16/458; Y10T 292/1021; Y10S 292/31; Y10S 292/63

See application file for complete search history.

(56) References Cited

U.S. PATENT DOCUMENTS

| | | | |
|---|---|---|---|
| 3,020,075 | A | 2/1962 | Johnstone et al. |
| 3,153,552 | A | 10/1964 | Sandor |
| 4,580,821 | A | 4/1986 | Genord, Jr. et al. |
| 4,703,963 | A | 11/1987 | Ball |
| 4,895,403 | A | 1/1990 | Osenkowski |
| 5,123,687 | A | 6/1992 | Pfeiffer et al. |
| 5,560,659 | A | 10/1996 | Dault et al. |
| 5,669,642 | A | 9/1997 | Kang |
| 6,106,036 | A | 8/2000 | Okada et al. |
| 6,427,502 | B1 | 8/2002 | Zagoroff et al. |
| 7,057,124 | B2 | 6/2006 | Seiki |
| 7,543,863 | B2 | 6/2009 | Herbert et al. |
| 8,146,393 | B2 | 4/2012 | Katagiri et al. |
| 8,443,553 | B1 | 5/2013 | Polewarczyk et al. |
| 8,544,904 | B2 | 10/2013 | Kindig |
| 8,701,353 | B2 * | 4/2014 | Patel ..................... E05B 85/103 292/201 |
| 8,985,648 | B2 | 3/2015 | Müller et al. |
| 9,062,478 | B2 | 6/2015 | Bingle |
| 9,103,143 | B2 | 8/2015 | Wheeler et al. |
| 9,322,191 | B2 | 4/2016 | Müller |
| 9,605,452 | B2 | 3/2017 | Yoshino et al. |
| 9,957,737 | B2 * | 5/2018 | Patel ....................... E05B 85/10 |
| 10,024,085 | B2 | 7/2018 | Burns et al. |
| 10,072,447 | B2 | 9/2018 | Fujiwara |
| 10,655,371 | B2 | 5/2020 | Soonthornwinate et al. |
| 10,794,096 | B2 | 10/2020 | Hamacher et al. |
| 2001/0037702 | A1 | 11/2001 | Wood |
| 2002/0121786 | A1 | 9/2002 | Meinke |
| 2002/0148075 | A1 | 10/2002 | Monig |
| 2003/0019261 | A1 | 1/2003 | Wittwer |
| 2004/0009497 | A1 | 1/2004 | Kandel |
| 2004/0135380 | A1 | 7/2004 | Bruderick et al. |
| 2004/0177478 | A1 | 9/2004 | Louvel |
| 2004/0222649 | A1 | 11/2004 | Ito et al. |
| 2007/0069531 | A1 | 3/2007 | Herbert et al. |
| 2008/0084074 | A1 | 4/2008 | Monig et al. |
| 2008/0250607 | A1 | 10/2008 | Ito |
| 2009/0039671 | A1 | 2/2009 | Thomas et al. |
| 2009/0205383 | A1 | 8/2009 | Katagiri et al. |
| 2009/0309971 | A1 | 12/2009 | Schuetz |
| 2010/0060019 | A1 | 3/2010 | Mizushima |
| 2010/0127516 | A1 | 5/2010 | Fannon |
| 2011/0012378 | A1 | 1/2011 | Ueno et al. |
| 2011/0101709 | A1 | 5/2011 | Katsumata et al. |
| 2011/0148575 | A1 * | 6/2011 | Sobecki .................. E05B 5/006 292/336.3 |
| 2011/0154617 | A1 | 6/2011 | Tanaka et al. |
| 2011/0266816 | A1 | 11/2011 | Kindig |
| 2012/0119524 | A1 | 5/2012 | Bingle et al. |
| 2012/0128344 | A1 | 5/2012 | Kwon |
| 2012/0205925 | A1 | 8/2012 | Müller et al. |
| 2012/0247161 | A1 | 10/2012 | Müller et al. |
| 2013/0076048 | A1 | 3/2013 | Aerts |
| 2013/0170241 | A1 | 7/2013 | Lesueur et al. |
| 2013/0241215 | A1 | 9/2013 | Halliwell et al. |
| 2014/0000167 | A1 | 1/2014 | Patel et al. |
| 2014/0047877 | A1 | 2/2014 | Böhm et al. |
| 2014/0203574 | A1 | 7/2014 | Noda |
| 2014/0265372 | A1 | 9/2014 | Smart |
| 2014/0373580 | A1 | 12/2014 | Le |
| 2015/0225979 | A1 | 8/2015 | Garofoli |
| 2015/0233154 | A1 | 8/2015 | Smart et al. |
| 2015/0315811 | A1 | 11/2015 | Mao et al. |
| 2015/0315826 | A1 * | 11/2015 | Lang ..................... E05B 85/103 49/503 |
| 2016/0010369 | A1 | 1/2016 | Specht et al. |
| 2016/0160539 | A1 | 6/2016 | Saitou et al. |
| 2016/0222702 | A1 * | 8/2016 | Koizumi ................. E05B 81/64 |
| 2016/0281397 | A1 * | 9/2016 | Park ........................ E05B 81/36 |
| 2016/0290018 | A1 | 10/2016 | Hamacher et al. |
| 2016/0305164 | A1 | 10/2016 | Bendel |
| 2016/0369537 | A1 | 12/2016 | Rocci et al. |
| 2017/0292297 | A1 * | 10/2017 | Bartels .................. E05B 85/107 |
| 2017/0370123 | A1 * | 12/2017 | Papanikolaou ....... E05B 85/107 |
| 2019/0368239 | A1 * | 12/2019 | Rhein .................. E05B 85/103 |

FOREIGN PATENT DOCUMENTS

| | | | |
|---|---|---|---|
| DE | 3427178 | A1 | 2/1986 |
| DE | 19635097 | A1 | 3/1998 |
| DE | 19731325 | A1 | 1/1999 |
| DE | 19740827 | A1 | 3/1999 |
| DE | 29914393 | A1 | 11/1999 |
| DE | 19860229 | A1 | 7/2000 |
| DE | 10219634 | A1 | 11/2003 |
| DE | 10309821 | A1 | 9/2004 |
| DE | 102006027474 | A1 | 12/2007 |
| DE | 202011000861 | U1 | 8/2011 |
| DE | 102010056437 | A1 | 6/2012 |
| DE | 102011001001 | A1 | 6/2012 |
| EP | 1607556 | A1 | 12/2005 |
| FR | 2760721 | A1 | 9/1998 |
| GB | 2141976 | A | 1/1985 |
| GB | 2345437 | A | 7/2000 |
| GB | 2477085 | A | 7/2011 |
| JP | S4115997 | Y1 | 7/1966 |
| JP | S60138189 | A | 7/1985 |
| JP | S64052966 | A | 3/1989 |
| JP | A1995082933 | A | 3/1995 |
| JP | 2001040913 | A | 2/2001 |
| JP | 2004100429 | A | 4/2004 |
| JP | A2004100429 | A | 4/2004 |
| JP | 2004244991 | A | 9/2004 |
| JP | A2004244991 | A | 9/2004 |
| JP | 2005002632 | A | 1/2005 |
| JP | 2008081926 | A | 4/2008 |
| JP | 2008248630 | A | 10/2008 |
| JP | 2008248632 | A | 10/2008 |
| JP | 20100112005 | A | 5/2010 |
| JP | 2010242442 | A | 10/2010 |
| JP | 2011039027 | A | 2/2011 |
| JP | 2014522926 | A | 9/2014 |
| WO | WO0175252 | A1 | 10/2001 |
| WO | WO2008129003 | A2 | 10/2008 |
| WO | WO2012175647 | A2 | 12/2012 |

OTHER PUBLICATIONS

European Search Report corresponding to EP application No. 17177140.5, dated Nov. 21, 2018, 4 pages.

Extended European Search Report corresponding to EP application No. 17177140.5, dated Nov. 23, 2018, 7 pages.

(56) References Cited

OTHER PUBLICATIONS

Extended European Search Report corresponding to EP application No. 17177145.4, dated Nov. 23, 2018, 5 pages.
English summary of Japanese Office Action corresponding to JP application No. 2014516360, dated Jan. 20, 2015, 2 pages.
Great Britain Further Search Report Under Section 17 corresponding to application No. GB1211026.8, dated Mar. 22, 2013, 5 pages.
International Search Report corresponding to International application No. PCT/EP2012/062040, dated Jan. 31, 2013, 4 pages.
Japanese Office Action in Japanese with English summary corresponding to JP application No. 2015142261, dated Feb. 31, 2017, 6 pages.
Japanese Office Action in Japanese with English summary corresponding to JP application No. 2015142261, dated Sep. 16, 2016, 4 pages.
Japanese Office Action in Japanese with English summary corresponding to JP application No. 2014516360, dated Nov. 18, 2016, 4 pages.

* cited by examiner

RETRACTABLE HANDLE ARRANGEMENT FOR A DOOR OR THE LIKE

TECHNICAL FIELD

The present invention relates to a retractable handle arrangement for a door or other closure, and a method of deploying a retractable door handle arrangement. Aspects of the invention relate to a handle arrangement, to a body component, to a method and to a vehicle.

BACKGROUND

The invention will be described in the context of a car door but it can be used with other closures on a vehicle, such as a tailgate, or with other types of vehicle, such as aircraft. Indeed, in a broad sense, the retractable handle arrangement of the invention can be used in non-vehicular applications.

The demands of aesthetics, aerodynamics and wind-noise control often make it desirable for a door handle to lie flush with the surrounding door skin of a vehicle. Flap-type door handles may be used for this reason. Such handles comprise a typically top-pivoted flap that is pulled against spring bias and hence pivoted outwardly with respect to the surrounding door skin to unlatch the door. A finger recess is usually provided in the door skin adjacent to, most commonly underneath, the flap of the handle. This recess gives finger access to the rear of the handle so that the handle may be pulled to unlatch and open the door.

A flap-type handle tends to be awkward to use and cannot be grasped as comfortably or satisfyingly as other handle types. Perhaps the most convenient handle type has a protruding bar-like grab or handgrip that may be gripped in the user's hand, an example being a strap-type handle in which the handgrip is part of a loop.

Strap-type handles have particular benefits over flap-type handles in terms of ergonomics and load transferral: for example, when using a flap-type handle, it is not possible for the user to choose whether to use an overhand or underhand grip style. Also, a flap-type handle constrains where the handle may be positioned on the vehicle with respect to the user's stance. Unfortunately, however, the protruding handgrip of a strap-type handle does not have the benefits of flush mounting.

A flap-type handle with its associated finger recess is also an aesthetic constraint. There have therefore been several proposals in the prior art to provide a finger recess with a hinged cover plate that lies flush with the door skin and with the adjacent flap-type handle but that pivots inwardly to admit the user's fingers to operate the handle. However, this cover plate does not solve the inherent problems of a flap-type handle: if anything, it makes the handle more difficult to use. Also, arguably, a cover plate may look no better than leaving the finger recess uncovered.

To solve some of these problems and to offer a 'surprise and delight' feature, some flush-mounted door handles are retractably mounted to a vehicle. This means that the handle can move between two states: a stowed or retracted state in which the handle is flush-mounted and a deployed or extended state in which the handle stands proud of the surrounding bodywork to be easier to grasp. Movement of the handle between the stowed and deployed states may be effected by means of an automated mechanism.

Once in the deployed state, the handle can then be pulled to open the door. This involves moving the handle to a third, operative state to unlatch the door, typically by pivoting the deployed handle against spring bias. In moving from the deployed state to the operative state, the handle may unlatch the door mechanically, for example by pulling a Bowden cable acting on the door latch, or electrically, for example by switching a solenoid acting on the door latch.

A problem with a retractable door handle of the kind described above exists where an automated mechanism is used to retract the door handle from the deployed state to the stowed state. In this case, there is a danger that a user's fingers may become trapped between the handle and the surrounding door skin in the case that the user is holding the handle as it retracts.

Moreover, a retractable door handle of the kind described above may be susceptible to damage in the case of abuse by a user. Such damage may occur in the event that a user tries to force the door handle from the deployed state into the stowed state thereby applying stresses which could damage the mechanism.

Furthermore, another problem associated with a retractable handle arrangement is to provide the user with the associated functionality, such as means to lock and unlock the door, in a way which is intuitive and simple to use.

It is an object of the present invention to provide an improved retractable handle arrangement.

SUMMARY

Aspects of the invention relate to a handle arrangement, to a body component, to a method and to a vehicle as claimed in the appended claims.

According to an aspect of the present invention there is provided a retractable handle arrangement comprising:

a handle adapted and arranged to be mounted flush within a panel, the handle being movable between stowed and deployed states;

a motor: and a transmission device arranged to couple the motor to the handle for moving the handle from the stowed state to the deployed state when the motor is driven in a first direction, wherein, at least in the initial phase of deployment of the handle, the handle arrangement is arranged to provide a force to deploy the handle which is greater than a predetermined force.

The applicant has recognized that a problem exists with retractable door handles in that the handle must be in the deployed state before a user can grasp the handle to open the door. In wet and freezing conditions the door handle arrangement may become iced-up. Thus, in the case that the deployment of the handle is effected by means of an automated mechanism ice may prevent the handle from deploying, leaving the user no way of opening the door until the door handle has been de-iced, which is inconvenient and time-consuming. The applicant therefore has recognized the need for a door handle arrangement in which the force used in at least an initial phase of deployment is above a predetermined level, i.e. above a level needed to break any ice which has accumulated between the handle and any surrounding features so that the handle can be moved.

According to another aspect of the present invention, there is provided a retractable handle arrangement comprising:

a handle adapted and arranged to be mounted flush within a panel, the handle being movable between stowed and deployed states;

a motor; and a transmission device arranged to couple the motor to the handle for moving the handle from the stowed state to the deployed state when the motor is driven in a first direction, and to modulate the force exerted on the handle and the speed at which the handle is deployed as the handle travels from the stowed state to the deployed state.

Thus, the present invention provides a retractable handle arrangement in which control of the force exerted on the handle and the speed at which the handle is deployed is controlled by the configuration of the transmission device and does not require variable control of the motor.

In an embodiment, the transmission device is configured such that a greater force is exerted on the handle during an initial deployment phase than during a second, subsequent deployment phase.

Accordingly, an initial force exerted on the handle can be selected so as to be sufficient to break through any ice on or in the handle arrangement and, once the handle has been moved from the stowed state, the force can be reduced accordingly.

Advantageously, the transmission device may be configured such that the speed of travel of the handle is greater during the second deployment phase than during the initial deployment phase. Thus, the deployment time of the handle can be optimized so that a user does not have to wait for a long time for the handle to reach the deployed state.

The transmission means may be configured such that the handle is gradually brought to a stop in the deployed state during a third deployment phase. Thus, the handle can be brought to a gradual stop so as to provide a refined and elegant appearance.

In an embodiment, in use, the motor is driven at a constant speed as the handle travels from the stowed state to the deployed state.

In an embodiment, the handle comprises an operating member and the transmission means comprises:

a worm gear disposed on an output shaft of the motor;

a gear wheel arranged in meshed engagement with the worm gear rotatable about an axis;

an eccentric cam mounted coaxially with the gear wheel; and a rocker arm having a first end in abutting, frictional engagement with the cam and a second end in abutting, frictional engagement with the operating member, the rocker arm being pivotable about an axis disposed between the first and second ends. Optionally, the cam is an eccentric cam.

In another embodiment, the handle comprises an operating member and the transmission means comprises:

a cam mounted coaxially with the gear wheel; and a rocker arm having a first end in abutting, frictional engagement with the cam and a second end in abutting, frictional engagement with the operating member, the rocker arm being pivotable about an axis disposed between the first and second ends. Optionally, the cam is an eccentric cam.

In some embodiments, the shape and/or profile of the cam is configured and/or arranged to characterize the force and/or speed with which the handle is deployed according a predefined cycle. Optionally, the cam is an eccentric cam.

Optionally, the force and the speed with which the handle is deployed can be modulated or controlled independently.

Optionally, the handle comprises an operating member and the transmission means comprises:

a gear disposed on an output shaft of the motor;

a gear wheel arranged in meshed engagement with the worm gear rotatable about an axis. Optionally, the gear is a worm gear.

In an embodiment, the handle is pivotable about an axis such that it rotates about the axis when it is moved from the stowed state to the deployed state.

In an embodiment, the retractable handle arrangement comprises a return spring arranged so as to bias the handle toward the stowed state.

According to another aspect of the present invention, there is provided a body component for a vehicle comprising a panel having an outer surface having an aperture for receiving the handle of the retractable handle arrangement described hereinabove wherein the aperture receives the handle as a close fit and the outer surface of the handle is shaped to match and lies flush with the outer panel when the handle is in a stowed condition.

In some embodiments, the axis about which the handle rotates is arranged such that a first portion of the handle is pivoted internally of the panel and a second portion of the handle is pivoted externally of the panel.

Optionally, the handle is manually operable by engaging the first portion so as to provide access to the second portion.

A flexible sealing member may be provided between the handle and the aperture in the panel.

According to a further aspect of the present invention, there is provided a method of deploying a motor-driven retractable handle arrangement comprising a handle movable between stowed and deployed states via a transmission means arranged to couple the motor to the handle for moving the handle from the stowed state to the deployed state when the motor is driven in a first direction, the method comprising exerting a greater force on the handle during an initial deployment phase than during a second, subsequent deployment phase and/or moving the handle at a greater speed during the second deployment phase than during the initial deployment phase.

Advantageously, the method comprises bringing the handle to a gradual stop in the deployed state during a third deployment phase.

According to another aspect of the present invention, there is provided a retractable handle arrangement comprising:

a handle adapted and arranged to be mounted flush within a panel, the handle being movable between stowed and deployed states, and arranged such that it can be maintained in a deployed position;

the handle comprising an elongate element behind which a user can place their fingers to pull the handle, the handle further comprising a top cover portion extending from the top of the elongate element, the cover portion being arranged, when the handle is in the deployed state, to substantially close the gap between the handle and the panel, the handle further comprising an end cover portion, arranged to cover, in the deployed state, at least a portion of the end of the elongate element which in use is deployed out from the panel.

Preferably the cover portion is a top cover portion, extending substantially from the top of the elongate element.

The applicant has recognized that, if the handle is to be left in a deployed state, it would be advantageous for a cover portion as described above to prevent items, such as clothing, bag straps, etc. from becoming looped over the handle. In addition, when the user grips the handle in an underhand grip, the end cover portion helps to prevent the user's fingers from slipping off the end of the handle. The top cover portion and end cover portion may form a continuous cover portion. The end portion may extend over the entire end of the elongate element. The end of the elongate element may be curved.

Within the scope of this application it is envisaged that the various aspects, embodiments, examples and alternatives, and in particular the features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying drawings, in which.

DETAILED DESCRIPTION OF EMBODIMENTS

Detailed descriptions of specific embodiments of a handle arrangement, a method and a vehicle of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the handle arrangement, method and the vehicle described herein may be embodied in various and alternative forms. The figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
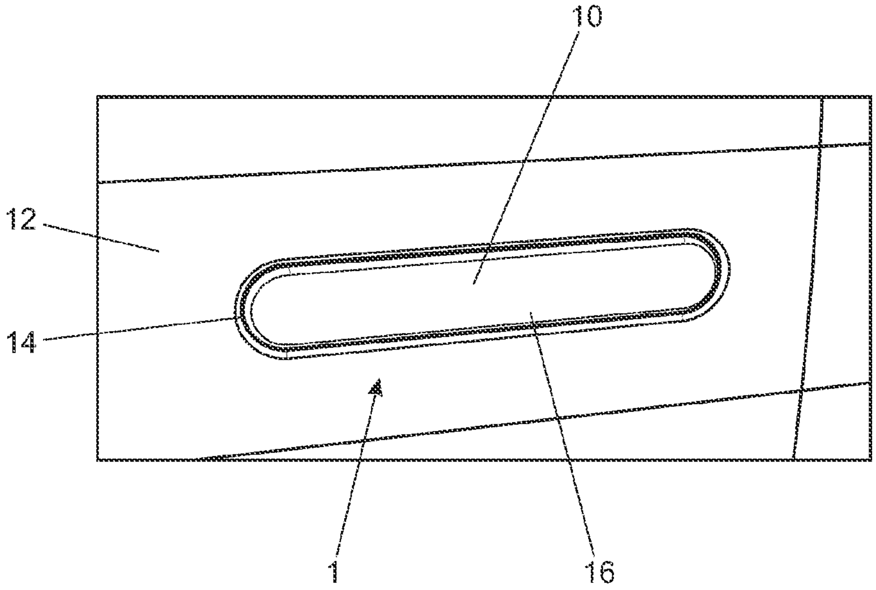
FIG. 1 is a perspective view of the exterior of a vehicle door fitted with a door handle arrangement in accordance with an embodiment of the present invention, the door handle being shown in a stowed state.

Referring to FIG. 1, in a door handle arrangement 1 of one embodiment of the invention, a flush-mounted door handle 10 is retractable with respect to a door of a vehicle. A painted door skin 12 is shown here to represent the door.

The door skin 12 is penetrated by a horizontally-extending slot 14 that receives the handle 10 as a close fit. The outer surface 16 of the handle 10 is shaped to match the slot 14 and lies flush with the surrounding door skin 12 when the handle 10 is stowed as shown in FIG. 1. The shape of the slot 14 and of the outer surface 16 of the handle 10 is chosen for aesthetic reasons and is largely immaterial in terms of function.

While shown in a contrasting tone for clarity in the drawings, at least the outer surface 16 of the handle 10, and possibly the entire handle 10, is painted in the same color as the vehicle body. Other finishes may, of course, be chosen instead, again for aesthetic reasons.

Figure 2A:
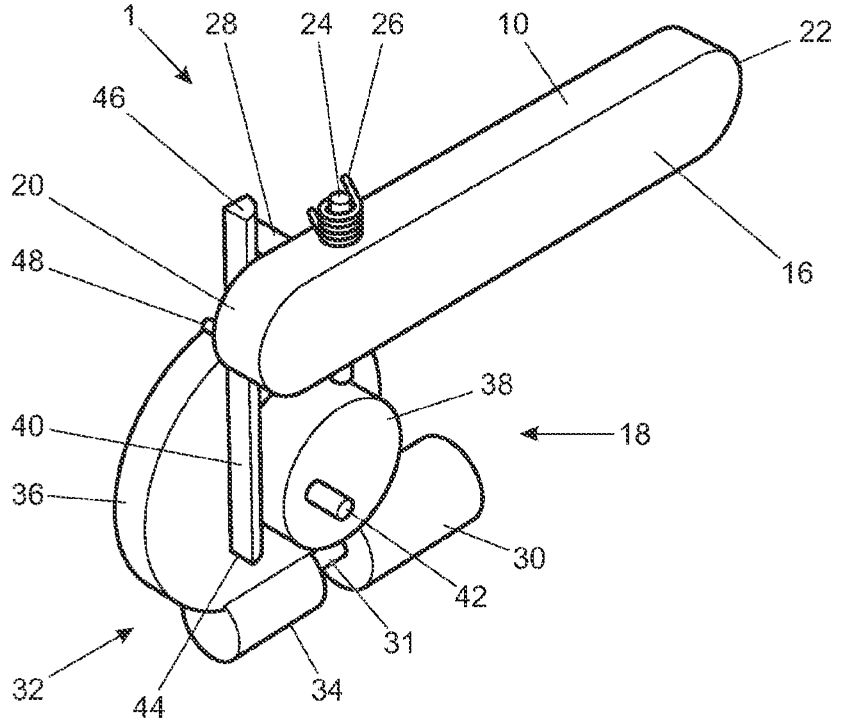
FIGS. 2A and 2B are perspective views showing respective opposite sides of the mechanism of the door handle arrangement of FIG. 1, with the door handle in the stowed state.
Figure 2B:
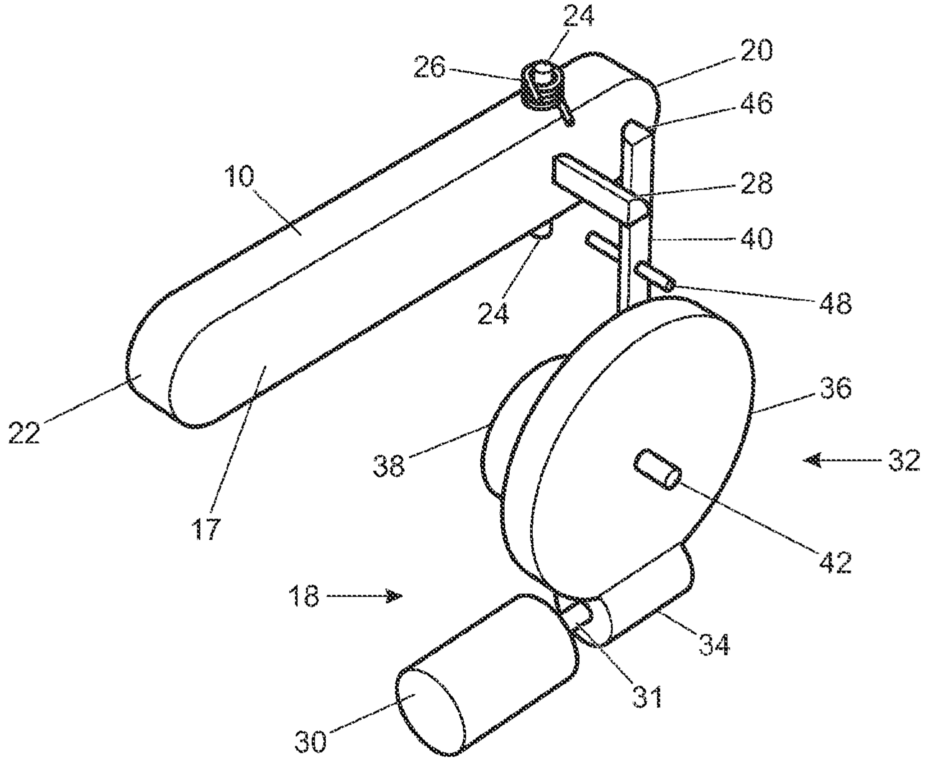

Referring to FIGS. 2A and 2B, the retractable handle arrangement 1 comprises a mechanism 18 which is operable to move the handle 10 between the stowed state and a deployed state, as will be described in more detail later.

The handle 10 is an elongate member having first and second ends 20, 22. Pivot means 24 are disposed proximate to the first end 20 and define an axis about which the handle 10 is rotatable, when it moves between the stowed and deployed states. A return spring 26 is provided on the pivot means 24 so as to bias the handle 10 toward the stowed position. An operating member 28 projects perpendicularly from an inner surface 17 of the handle 10, which is opposite the outer surface 16. The operating member 28 is disposed at substantially the same distance along the length of the handle 10 from the first end 20 as the pivot means 24.

The mechanism 18 comprises a motor 30 which is coupled to transmission means 32. The transmission means 32 comprises a worm gear 34, a gear wheel 36, a cam 38 and a rocker arm 40. In more detail, the worm gear 34 is disposed on an output shaft 31 of the motor 30 and is coaxial therewith. The gear wheel 36 is disposed adjacent to the worm gear 34 for meshed engagement therewith.

The gear wheel 36 is mounted so as to be rotatable about an axis 42 which is perpendicular to the axis of rotation of the worm gear 34. The cam 38 is disposed adjacent to the gear wheel 36 and mounted such that the cam 38 also rotates about the axis 42 when the gear wheel 36 rotates.

The rocker arm 40 has first and second ends 44, 46 and is pivotally mounted about a rocker axis 48 which is parallel to the axis 42 of the gear wheel 36 and the cam 38. The rocker axis 48 is disposed toward the second end 46 of the rocker arm 40. The first end 44 of the rocker arm 40 abuts the surface of the cam 38. The second end 46 of the rocker arm 40 abuts the operating member 28 of the handle 10.

In the stowed state illustrated in FIG. 1, the outer surface 16 of the handle 10 lies flush with the surrounding door skin 12. The handle 10 may be driven from its stowed state to its deployed state in response to various events. For example, this movement may be in response to an unlocking signal from a key authorized to unlock the vehicle or from a presence sensor that detects the presence of an authorized key in the immediate vicinity of the vehicle. Conversely, the handle 10 may be driven from its deployed state to its stowed state in response to a locking signal from a key authorized to lock the vehicle or from a presence sensor that determines that the authorized key has left the immediate vicinity of the vehicle. The handle 10 may also toggle between the stowed and deployed states in response to a further action from the user, for example pressing a switch (not shown in FIG. 1) on the vehicle door.

Figure 3A:
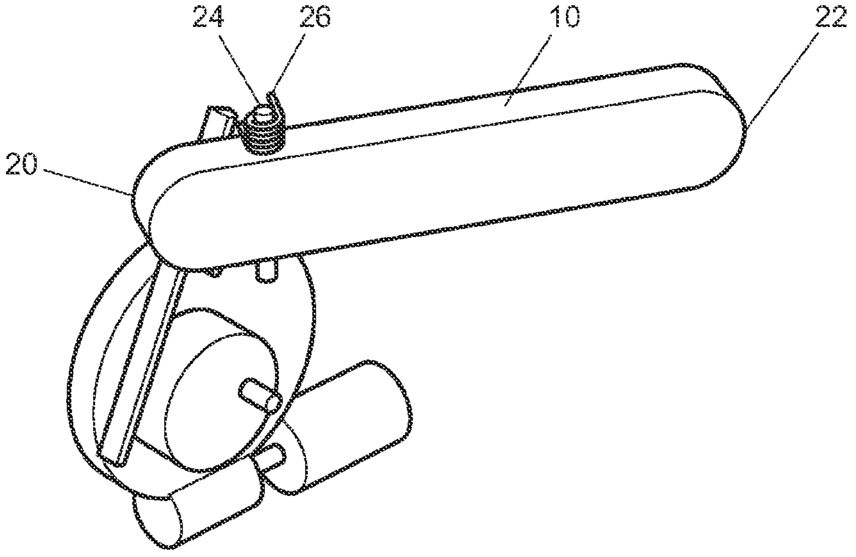
FIGS. 3A and 3B are perspective views showing respective opposite sides of the mechanism of the door handle arrangement of FIG. 1, with the door handle in a deployed state.
Figure 3B:
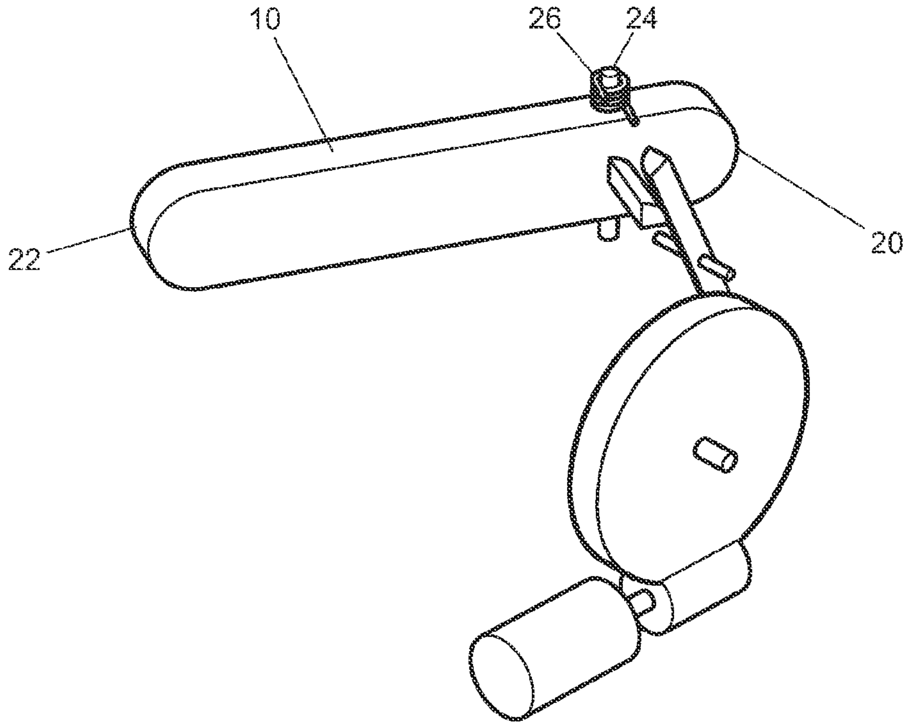

Referring to FIGS. 3A and 3B, in its deployed state, the handle 10 is rotated about the pivot means 24 against the biasing force of the return spring 26 such that the second end 22 of the handle protrudes from the slot 14 (not shown in FIGS. 3A and 3B) by an amount sufficient to allow a user to put their fingers around the handle 10. In the embodiment of the invention shown in FIGS. 3A and 3B, the handle 10 is a bar-type handle which can be grasped with either an underhand or an overhand grip. With such a bar-type handle, the user's thumb will typically be positioned toward the first end 20 of the handle 10 when pulling the handle from the deployed state to an operative state. As explained previously, when the handle is in the operative state, this causes the door to be opened. While not shown in the accompanying Figures, in the present embodiment, the operative state corresponds to a position in which the handle 10 is further rotated about the pivot means 24 beyond the deployed state.

The operation of the retractable handle arrangement 1 will now be described in more detail.

Figure 4A:
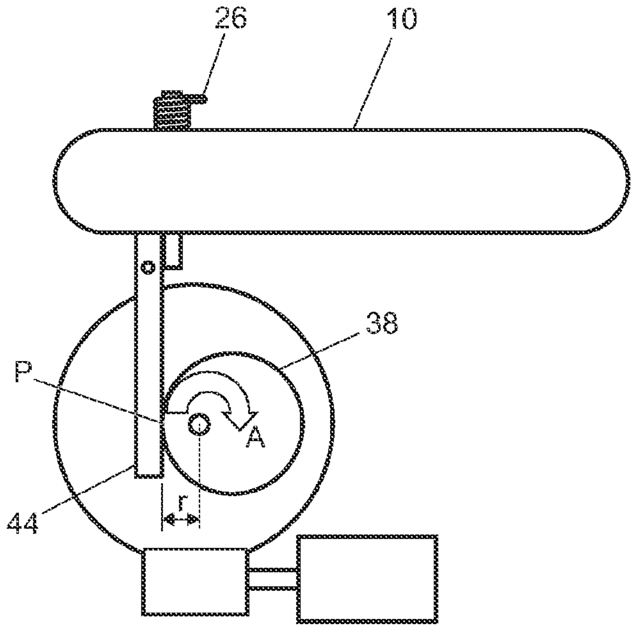
FIGS. 4A, 4B and 4C are respective side, front and top plan views of the mechanism of the door handle arrangement of FIG. 1, with the door handle in the stowed state.
Figure 4B:
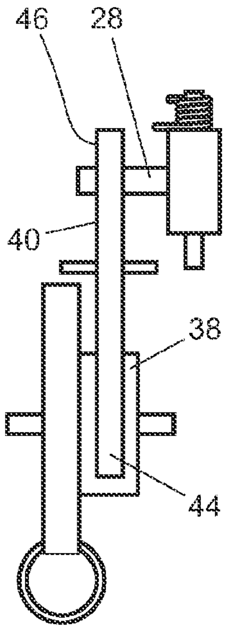
Figure 4C:
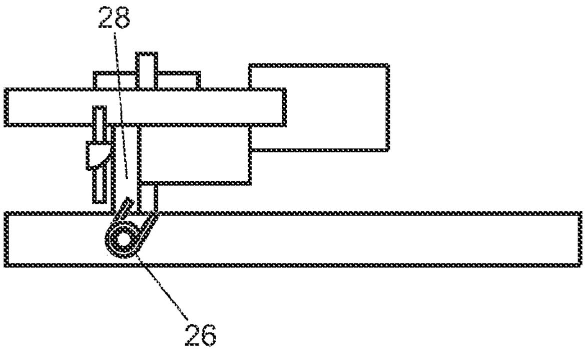

Referring to FIGS. 4A, 4B and 4C, with the handle 10 in the stowed state, the rocker arm 40 is disposed substantially vertical. The return spring 26 acts to bias the handle 10 towards the stowed state. Accordingly, the operating member 28 of the handle 10 presses against the second end 46 of the rocker arm 40 which, in turn, causes the first end 44 of the rocker arm 40 to press against the surface of the cam 38, thereby ensuring frictional contact between the rocker arm 40 and the cam 38. In order to deploy the handle 10, the motor 30 is driven to rotate the worm gear 34 such that the gear wheel 36 and the cam 38 are rotated in the direction of arrow A in FIG. 4A.

Figure 5A:
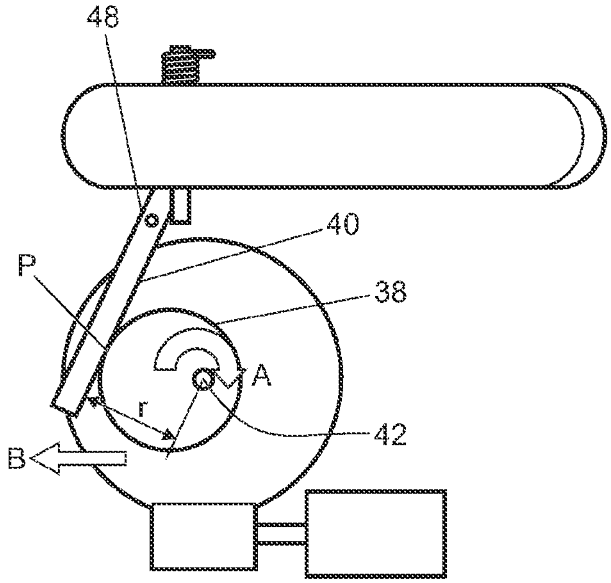
FIGS. 5A, 5B and 5C are respective side, front and top plan views of the mechanism of the door handle arrangement of FIG. 1, with the door handle in the deployed state.
Figure 5B:
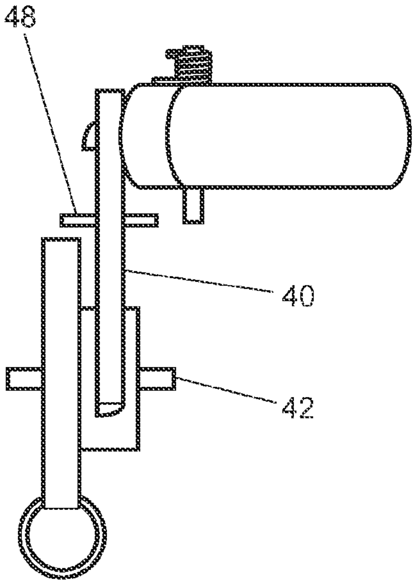
Figure 5C:
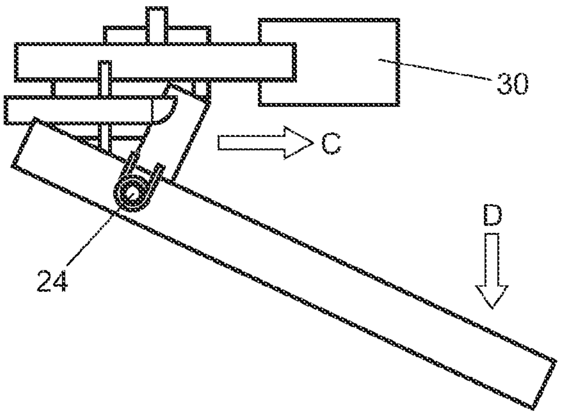

Referring to FIGS. 5A, 5B and 5C, the cam 38 is profiled such that, as it rotates in the direction of arrow A, the radial distance r between the axis of rotation 42 and the surface of the cam 38 at the point of contact P between the cam 38 and the first end 44 of the rocker arm 40 increases. Thus, the rotation of the cam 38 causes the rocker arm 40 to be pivoted about the rocker axis 48. The first end 44 of the rocker arm 40 moves in the direction of the arrow B in FIG. 5A. This produces a corresponding movement of the second end 46 of the rocker arm 40 in the direction of arrow C in FIG. 5C. The second end 46 of the rocker arm 40 presses against the operating member 28 of the handle 10 thereby causing the handle 10 to rotate about its pivot means 24 in the direction of arrow D in FIG. 5C until it reaches the deployed position at which point the motor 30 stops.

As the cam 38 rotates from its initial position where the handle 10 is in the stowed state, the point of contact P between the surface of the cam 38 and the rocker arm 40 migrates towards the rocker axis 42. Accordingly, the force applied to the operating member 28 of the handle 10 by the second end 46 of the rocker arm 40 varies. More specifically, during an initial deployment phase, the rocker arm 40 contacts the cam 38 proximate to its first end 44, i.e. further away from the rocker axis 48. The result is that a greater force is exerted on the operating member 28 during the initial phase, and thus a greater torque is applied to the handle 10. The profile of the cam 38 is such that the rate of change of the radial distance r is relatively small during this initial phase. Accordingly, the handle 10 moves relatively slowly.

As the cam 38 continues to rotate during a second deployment phase, the point of contact P moves closer to the rocker axis 48 and the force applied to the operating member 28 is reduced. This coincides with a more rapid increase in the radial distance r which results in the handle 10 being moved at a higher speed.

Accordingly, with the above-described configuration a high force can be applied to the handle during the initial phase, such force being selected so as to be sufficient to break through any ice, in the event that the handle 10 is subjected to wet and freezing conditions (the required force may be about 200 N). Once the handle 10 has been moved from the stowed state, the force applied to it is reduced and the speed of deployment is increased so that the user does not have to wait for a long time for the handle 10 to deploy. During deployment of the handle 10, the motor 30 is driven at a constant speed of rotation. The configuration of the transmission means 32 modulates the force applied to the handle 10 and the speed at which the handle 10 is deployed.

In order to retract the handle 10 from the deployed state back into the stowed state, the motor 30 is driven in reverse which, in turn, rotates the gear wheel 36 and the cam 38 in the direction opposite to arrow A in FIGS. 4A and 5A. The biasing force of the return spring 26 causes the handle 10 to move toward the stowed state. As the handle 10 retracts, the operating member 28 causes the rocker arm 40 to rotate back to its initial position shown in FIGS. 4A, 4B and 4C. Accordingly, during retraction of the handle 10, although the motor 30 is driven, the mechanism 18 does not exert a closing force on the handle 10. This is advantageous because, in the event that a user is holding the handle 10 as it retracts, the force against the user's hand is limited to that of the return spring 26.

A further advantage of the above-described retractable handle arrangement 1 is that the transmission means 32 is protected from damage caused by abuse in the event that the handle 10 is pushed inwards when in the deployed state before it has been retracted by the mechanism 18. More specifically, if the handle 10 is pushed inwards when in the deployed state, the operating member 28 presses against the surface of the cam 38, but no force is transferred to the gear wheel 36 or the worm gear 34. Accordingly, the mechanism is not back driven and the teeth of the gear wheel 36 are protected from damage.

In a further embodiment of the present invention, the cam 38 profile may be such that there is a third deployment phase of the handle 10. In more detail, the cam 38 may be profiled such that as it rate of change in the radial distance r reduces after the second deployment phase. Accordingly, after the handle 10 is moved quickly during the second phase, it slows down gradually during the third phase until it stops in the deployed state, thereby producing a pleasing aesthetic effect.

It will be appreciated by those skilled in the art that, while the above description refers to initial, second and third deployment phases, the cam 38 has a continuous surface and, therefore, the transitions between each of the deployment phases are continuous.

Furthermore, it is an advantage of the handle arrangement 1 of the present invention that the deployment speed/force profile can be easily tuned for a variety of applications by simply installing a cam 38 with the desired surface profile.

Figure 6:
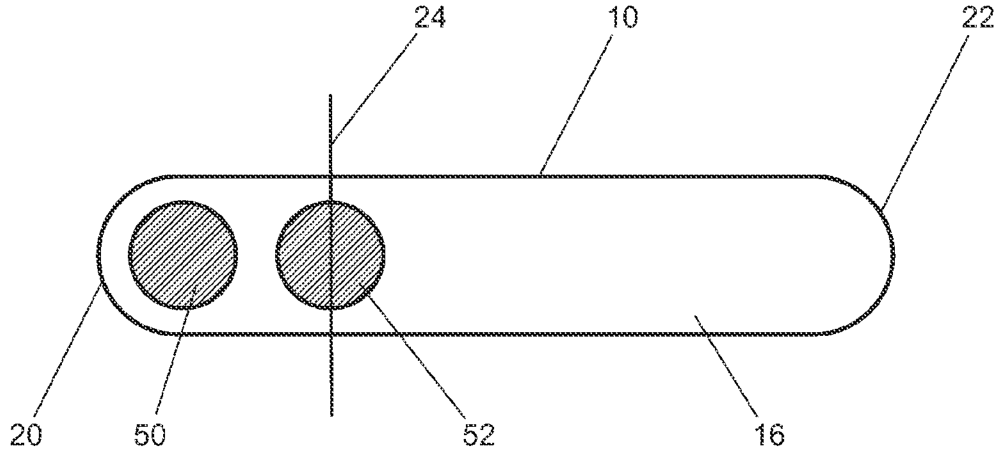
FIG. 6 shows the positions of an unlock and a lock button on the handle of the retractable handle arrangement of FIG. 1.

Referring to FIG. 6, the handle 10 may also comprise an unlock button 50 and a lock button 52 disposed on the outer surface 16 thereof. The buttons 50, 52 may be touch sensitive buttons, i.e. capacitive sensors, or they may be microswitches. The full functionality of the buttons 50, 52 will be described in more detail later. However, the positions of the buttons 50, 52 on the handle 10 are selected so as to be both intuitive for the user and to reduce the possibility of incorrect use of the handle arrangement 1.

The unlock button 50 is disposed adjacent to the first end 20 of the handle 10. As mentioned previously when a user operates the handle 10 the user's thumb will typically be at the first end 20. Thus, when a user presses the unlock button 50 with their thumb, which unlocks the associated door and causes the handle 10 to be moved into the deployed state, their hand is naturally positioned such that it is easy and convenient for them to grasp the deployed handle 10 and open the door by pulling it to the operative position.

Furthermore, the unlock button 50 is advantageously positioned in the event that a user is required to deploy the handle 10 manually, for example, if there is a loss of power to the motor 30. In this case, as the user applies pressure to the unlock button 50, the associated door will be unlocked as before. Subsequently, as the user applies increased pressure on the unlock button 50, the handle 10 will be rotated about the pivot means 24 against the biasing force of the return spring 26. Once the second end 22 of the handle protrudes from the slot 14, the user can grasp the handle 10 and pull it to the operative state to open the door. Accordingly, the handle 10 can be manually deployed by a user simply applying pressure at the unlock button 50, without requiring any more complex actions which require a greater degree of dexterity.

The lock button 52 is disposed adjacent to the pivot means 24 of the handle 10. As will be explained in more detail later, the handle 10 will usually be in the deployed state when its associated door is unlocked and pressing the lock button 52 will cause the door to be locked and the handle 10 to be retracted to the stowed state. As mentioned previously, it is undesirable for a user to press the handle 10 toward the stowed state when it is deployed because, while not causing damage to gear wheel 36, it puts pressure on the rocker arm 40, which could cause it to bend. Accordingly, the position of the lock button 52 adjacent to the pivot means 24 of the handle 10 is advantageous because any pressure applied to the lock button 52 will not cause rotation of the handle 10 about the pivot means 24.

Furthermore, with the above described arrangement, the functions of the unlock and lock buttons 50, 52 will be intuitive to a user unfamiliar with the operation of the handle arrangement 1. In particular, the position of the unlock button 50 at the first end 20 of the handle 10 will be associated in the mind of the user with opening the door because pressure at this position on the handle 10 causes it to move from the stowed to the deployed state. It follows that the other button 52 will be associated with locking because a user will naturally associate the presence of two buttons on the handle 10 with locking and unlocking functions.

The above-described arrangement achieves this effect while ensuring that the lock button 52 is located in a position which is convenient for a user to press and which will not cause damage to the mechanism 18 of the handle arrangement 1 if pressed with a high force.

Figure 7:
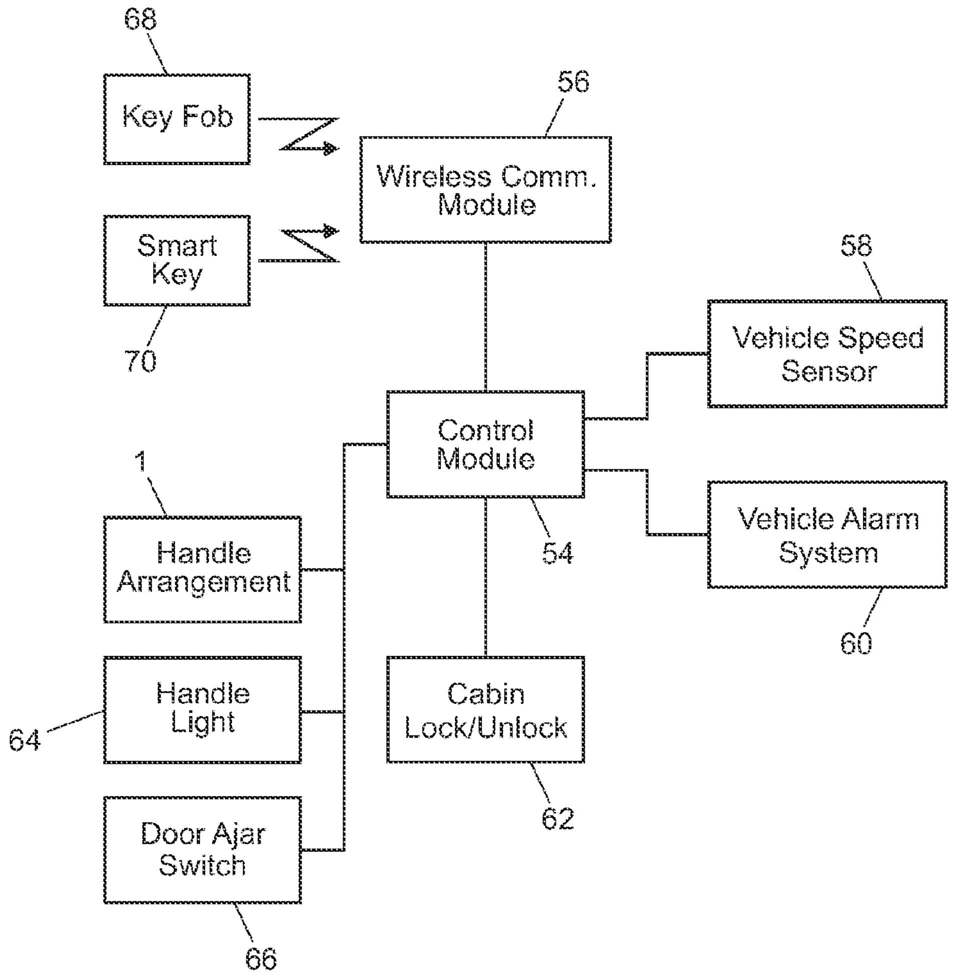
FIG. 7 shows an embodiment of a system for controlling the operation of the retractable handle arrangement of FIG. 1.

Referring to FIG. 7, a system for controlling a retractable handle arrangement 1 of the kind described above comprises a control module 54 for controlling the mechanism 18 of each retractable handle arrangement 1 on a vehicle. Although only a single handle arrangement is shown in FIG. 7, it will be appreciated that each door of the vehicle may be provided with one.

The control module 54 is also coupled to a wireless communication module 56, a vehicle speed sensor 58, a vehicle alarm system 60, door lock and unlock controls in the vehicle cabin 62, a handle light 64 and a door ajar switch 66. The wireless communication module 56 is operable to receive signals from a vehicle key fob 68. The key fob 26 is provided with respective door lock and unlock buttons and means for transmitting respective lock and unlock signals to the wireless communication module 56 in response to a user pressing the relevant button. The wireless communication module 56 is also operable to detect the presence of a smart key 70 within a target distance from the vehicle (typically 1-2 m) to enable passive entry. Also, the driver's door of the vehicle can be mechanically locked or unlocked from outside the vehicle via a key barrel positioned underneath the driver's door handle. Thus, the key barrel will be revealed any time the handle is moved to the operative state.

Each retractable handle arrangement 1 may comprise a light 64, such as an LED, for illuminating the handle 10 and its immediate surroundings so as to facilitate the opening of the doors in low-light conditions. Each retractable handle arrangement 1 may also comprise a pair of limit switches for detecting when the handle 10 is in each of the stowed and deployed states.

The operation of the control module 54 will now be described in more detail.

When the vehicle is parked, each handle 10 is in the stowed state, i.e. flush with the door skin 12, when its associated door is locked, and each handle 10 is in the deployed state when its associated door is unlocked. Deployment is thus triggered by unlocking and retraction by locking.

Locking and unlocking are triggered by either using the lock and unlock buttons on the key fob 68 or the passive entry lock and unlock buttons 50, 52 provided on each handle 10. More specifically, for access via passive entry, the user carries the smart key 70 on their person. When the smart key 70 is within a target range of a particular door handle 10 (typically 1-2 m) and the door unlock button 50 is operated, the control module 54 is operable to verify the presence of the smart key 70, by virtue of a signal received via the wireless communication module 56, and the handles 10 of all unlocked doors are deployed. The user can then open an unlocked door by pulling the associated handle 10 to its operative position thereby mechanically releasing the door latch. Each handle 10 returns to the stowed state when its associated door is locked. This may be achieved by a user pressing the lock button 52 on the handle 10 or by means of a cabin lock button 62 within the vehicle or the lock button on the key fob 68.

Accordingly, the deployment position of each handle 10 acts as a lock status indicator for each individual door. One exception to this may be provided when the vehicle is in motion in which case all the handles 10 of all doors, whether locked or unlocked, are in the stowed state. The handles 10 on any unlocked doors may be retracted into the stowed state in the event that the vehicle exceeds a threshold speed, for example, 5 miles per hour, which may be determined by the vehicle speed sensor 58. The handles 10 of the unlocked doors will then remain in the stowed state for the duration of the vehicle's journey and are only re-deployed in the case that the vehicle is determined to be stationary and either (i) one of the doors is opened from the inside (which can be determined by means of the door ajar switch 66 provided on each door), (ii) in the case that an unlocked door's handle unlock button 50 is operated by a person, even without the smart key 70 present (such as when picking up a passenger), or (iii) if the cabin unlock button 62 is pressed.

Pressing the handle lock button 52 once will centrally lock the vehicle and, if applicable, arm the vehicle alarm system 60. If the lock button 52 is pressed a second time within a predetermined time period, e.g. 3 seconds, a deadlock will be activated. The handles 10 will be retracted to the stowed state in response to the first press of the lock button 52. A 'global close' may be affected by pressing and holding the lock button 52, i.e. this may automatically close any open windows, and, if applicable to the vehicle, deploy a retractable roof, etc.

The handle light 64 will be switched on when the vehicle is unlocked and turned off when the vehicle is locked. If the vehicle is left in an unlocked state for more than a predetermined period of time, e.g. 20 seconds, the light 64 will turn off. Also, the light 64 will not be activated when the ignition is on.

A user need not wait for a handle 10 to fully deploy after pressing the handle unlock button 50 before opening the door, provided the user is able to grasp the handle 10 as it is being deployed sufficient to pull it to the operative state.

Figure 8A:
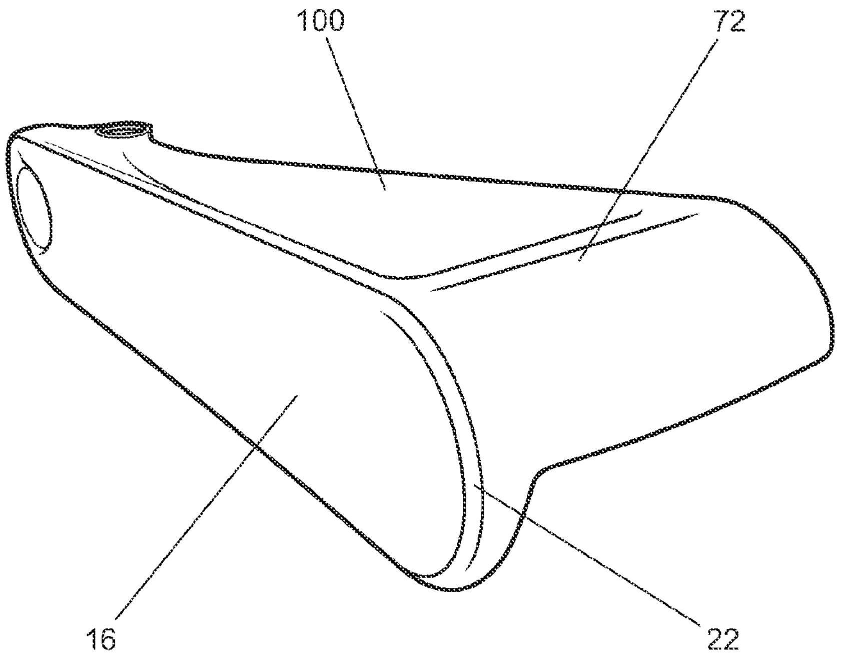
FIGS. 8A, 8B and 8C are perspective views of an alternative embodiment of a handle for use in the retractable handle arrangement of the present invention.
Figure 8B:
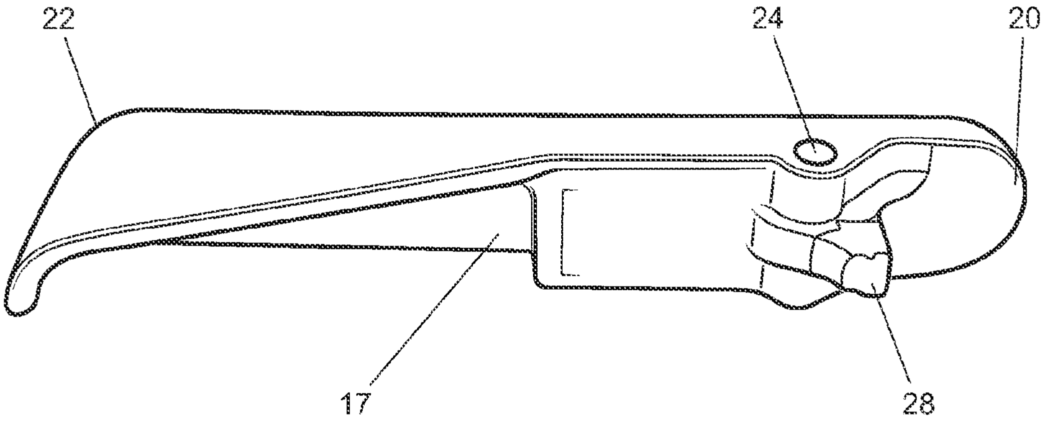
Figure 8C:
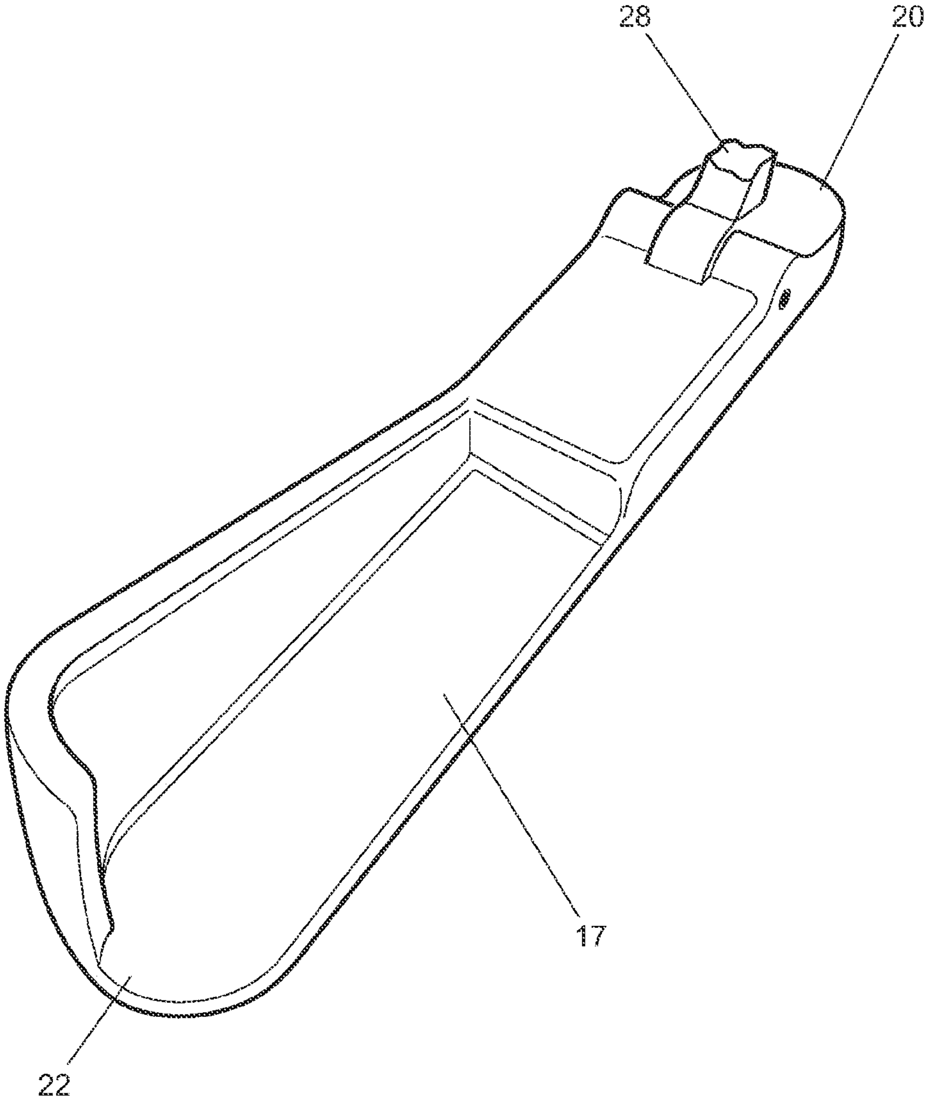

Referring to FIGS. 8A, 8B and 8C, an alternative embodiment of a handle 100 for use in the above-described retractable handle arrangement 1 comprises a top cover portion 72 which extends substantially perpendicular to the inner surface 17 along the length of the handle 100 and along a portion of the second end 22. The handle comprises an elongate element.

The presence of the top cover portion 72 requires a user to grasp the handle 100 with an underhand grip in order to open the associated door. An advantage of this handle configuration over the bar-type handle described previously is that the top cover portion 72 prevents items, such as clothing, bag straps, etc. from becoming looped over the handle 100 when it is in the deployed state. Accordingly, such a handle offers an improved safety aspect.

In this embodiment the top cover portion extends down the end of the handle, but the skilled person would appreciate that there may be provided a top cover portion and a separate end cover portion, as long as the arrangement performed the function of preventing items becoming looped over the handle.

It will be appreciated that the shape of the cam, or profile of the cam, may be varied to provide a desired characteristic, for example: the force or torque with which the handle is moved or pivoted during the deployment phase and/or stowing phase of the handle movement may be controlled or modulated by the cam profile; the speed, degree of displacement or rotation and acceleration with which the handle moves during the deployment phase and/or stowing phase of the handle movement may be controlled or modulated by the cam profile. The force or torque is modulated by determining and/or controlling the distance between the point at which the cam contacts the rocker arm and the pivot or fulcrum of the rocker arm. The degree of displacement, the angle through which the handle rotates can be controlled by selecting the maximum radial distance r which the cam displaces the rocker arm. The speed and/or acceleration of the handle are controlled by the rate of change in the radial distance r. It will be understood that the cam profile may be chosen to maintain a constant speed or a constant force throughout the deployment or stowing phase. It will also be appreciated that the cam profile may be asymmetric such that the characteristics are different in the deployment phase and the stowing phase, in such embodiments the motor may be driven in a constant rotational direction so as to employ a first portion of the cam profile for controlling the deployment phase and a second portion for controlling the stowing phase.

It will also be appreciated that the shape or profile of the rocker arm may also be varied.

The invention claimed is:

1. A retractable handle arrangement comprising:

a handle adapted to be mounted flush within a panel, the handle being movable between stowed and deployed states; and a button;

wherein:

the handle comprises an elongate member having first and second ends, the elongate member being pivotable about a pivot axis arranged substantially perpendicular to the length of the elongate member such that the handle rotates about the pivot axis when the handle is moved from the stowed state to the deployed state, with the deployed state having the second end of the elongate member pivoted outwardly such that the handle can be grasped by a user;

the retractable handle arrangement being configured, in response to the button being pressed by a user, to drive the handle about the pivot axis to move the handle from the stowed state to the deployed state; and wherein a distance of the button to the pivot axis is shorter than a distance of the button to the second end, and wherein the pivot axis is disposed between the button and the second end of the elongate member of the handle.

2. The retractable handle arrangement according to claim 1, wherein the button comprises at least one of a touch sensitive button and a microswitch.

3. The retractable handle arrangement according to claim 1, comprising a return spring arranged so as to bias the handle toward the stowed state.

4. The retractable handle arrangement according to claim 1, wherein the button is disposed between the pivot axis and the first end of the handle.

5. The retractable handle arrangement according to claim 1, wherein the handle can be deployed manually by applying pressure at the button.

6. The retractable handle arrangement according to claim 1, comprising an operating member projecting from an inner surface of the handle.

7. The retractable handle arrangement according to claim 6, wherein the operating member is disposed at substantially the same distance along the length of the handle from the first end as a pivot means defining the pivot axis.

8. The retractable handle arrangement according to claim 6, comprising a motor and a transmission mechanism arranged to couple the motor to the handle for moving the handle from the stowed state to the deployed state when the motor is driven.

9. The retractable handle arrangement according to claim 8, wherein the motor is driven so as to apply force to the operating member to rotate the handle about the pivot axis.

10. The retractable handle arrangement according to claim 1, in combination with a body component for a vehicle comprising the panel having an outer surface having an aperture for receiving the handle of the retractable handle arrangement, wherein the aperture receives the handle and an outer surface of the handle is shaped to match and lies flush with the outer surface of the panel when the handle is in the stowed state.

11. The retractable handle arrangement and body component according to claim 10, wherein the pivot axis about which the handle rotates is arranged such that a first portion of the handle is pivoted internally of the panel and a second portion of the handle is pivoted externally of the panel.

12. The retractable handle arrangement and body component according to claim 11, wherein the handle is manually operable by engaging the first portion so as to provide access to the second portion.

13. The retractable handle arrangement and body component according to claim 10, wherein a flexible sealing member is provided between the handle and the aperture.

14. A vehicle having a plurality of doors or other closures each of which comprises a retractable handle arrangement according to claim 1, wherein a control module is coupled to all of the handle arrangements provided on the vehicle.

15. A vehicle according to claim 14, wherein the control module is configured to, in response to the button of one of the retractable handle arrangements being pressed by a user, unlock the associated door and to control the associated motor of said retractable handle arrangement so as to move the handle from the stowed state to the deployed state.

16. A vehicle according to claim 15, wherein the control module is configured to control the associated motor of said retractable handle arrangement so as to move the handle from the deployed state to the stowed state in response to one of:

a determination that the associated door has been locked; and a determination that the vehicle is being driven above a threshold speed.

17. A retractable handle arrangement comprising:

a handle adapted to be mounted flush within a panel, the handle being movable between stowed and deployed states; and a button;

wherein:

the handle comprises an elongate member having first and second ends, the elongate member being pivotable about a pivot axis arranged substantially perpendicular to the length of the elongate member such that the handle rotates about the pivot axis when the handle is moved from the stowed state to the deployed state, with the deployed state having the second end of the elongate member pivoted outwardly such that the handle can be grasped by a user, wherein the pivot axis is disposed between the button and the second end of the elongate member of the handle;

the retractable handle arrangement being configured, in response to the button being pressed by a user, to drive the handle about the pivot axis to move the handle from the stowed state to the deployed state; and the button is disposed spaced from the second end such that when a user presses the button with their thumb, the user is able to place their fingers behind an outwardly pivoted portion of the elongate member between the button and the second end thereof.

18. A retractable handle arrangement comprising:

a handle having an outer surface adapted to be mounted flush within a slot on a panel, the handle being movable between stowed and deployed states, the handle comprising an elongate member having first and second ends, the elongate member being pivotable about a pivot axis arranged substantially perpendicular to the length of the elongate member such that the handle rotates about the pivot axis when the handle is moved from the stowed state to the deployed state, with the deployed state having the second end of the elongate member pivoted outwardly such that the handle can be grasped by a user, wherein, when in the stowed state, the outer surface at the first end is configured to be exposed and flush with the slot on the panel, and when in the deployed state, the outer surface at the first end is configured to pivot internally into the slot on the panel, and wherein the pivot axis is disposed between a button and the second end of the elongate member of the handle.

* * * * *